US009946554B2

(12) United States Patent
Day et al.

(10) Patent No.: US 9,946,554 B2
(45) Date of Patent: Apr. 17, 2018

(54) SYSTEM, METHOD, AND APPARATUS FOR CONFIGURING A STREAMED OPERATING SYSTEM WITH ASSOCIATED PERIPHERAL INFORMATION

(75) Inventors: John C. Day, Gilroy, CA (US); Jeffrey A. Kusnitz, Campbell, CA (US); Bryan S. Langston, Firestone, CO (US); John T. Timm, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 12/566,526

(22) Filed: Sep. 24, 2009

(65) Prior Publication Data

US 2011/0072118 A1    Mar. 24, 2011

(51) Int. Cl.
G06F 15/177    (2006.01)
G06F 9/44    (2018.01)
H04L 12/24    (2006.01)
H04L 29/08    (2006.01)

(52) U.S. Cl.
CPC ........ G06F 9/4411 (2013.01); H04L 41/0806 (2013.01); H04L 67/1097 (2013.01)

(58) Field of Classification Search
CPC .................... H04L 41/0806; H04L 67/1097
See application file for complete search history.

(56) References Cited

U.S. PATENT DOCUMENTS

| 5,717,930 | A | 2/1998 | Imai et al. |
| 5,898,772 | A | 4/1999 | Connors et al. |
| 6,292,641 | B1 | 9/2001 | Takeyama et al. |
| 6,449,642 | B2 | 9/2002 | Bourke-Dunphy et al. |
| 6,751,658 | B1 | 6/2004 | Haun et al. |
| 7,024,471 | B2 | 4/2006 | George et al. |
| 7,266,818 | B2 | 9/2007 | Pike et al. |
| 8,170,187 | B2 * | 5/2012 | Forte ........................ H04M 3/42 |
| | | | 379/112.02 |
| 2001/0034736 | A1 | 10/2001 | Eylon et al. |
| 2002/0016831 | A1 * | 2/2002 | Peled .................. G06Q 30/0601 |
| | | | 709/219 |
| 2002/0107776 | A1 * | 8/2002 | Bove et al. ....................... 705/37 |
| 2004/0044556 | A1 * | 3/2004 | Brady et al. ....................... 705/8 |

* cited by examiner

Primary Examiner — Hua Fan
(74) Attorney, Agent, or Firm — Kunzler, PC (57) ABSTRACT

A computer-implemented method for configuring an operating system to associate a peripheral is described. The method includes loading the operating system on a client computer based on an operating system image, determining an identifier of the client computer, retrieving peripheral information to identify a peripheral associated with the client computer, and writing a configuration setting of the client computer to a storage medium of the client computer based on the peripheral information. The identifier identifies the client computer. The peripheral information is associated with the client computer based on an association between the peripheral information and the identifier.

20 Claims, 7 Drawing Sheets

SYSTEM, METHOD, AND APPARATUS FOR CONFIGURING A STREAMED OPERATING SYSTEM WITH ASSOCIATED PERIPHERAL INFORMATION

BACKGROUND

In many computing environments, an operating system image is streamed to a client computer for loading of an operating system on the client computer. Often, a user's work area has a computer and one or more peripheral devices such as a telephone. When such a work area is configured, the operating system is loaded on the computer with the necessary applications, and then post installation configuration takes place. Part of this configuration includes manually configuring any software on the computer for the specific peripherals. For example, software that enables recording of a telephone call in association with actions on the computer is programmed to know what phone extension is being used with the client computer by manual input of configuration information by a user.

Traditionally, post installation configuration requires manual input from a user. This results in additional work for users and often creates errors in configuration. In other configurations, the configuration is statically encoded into the operating system image. Statically configured operating system images create difficulty in implementation of a virtualized work area where users use low cost thin client computers in differing work locations. Thus, it is difficult to present the user with a configuration that is customized for the user regardless of location.

SUMMARY

Embodiments of a computer program product are described. In one embodiment, the computer program product includes a computer useable storage medium to store a computer readable program that, when executed on a computer, causes the computer to perform operations, including an operation to determine an identifier to identify a client computer, retrieve peripheral information to identify a peripheral to be associated with the client computer, and write a configuration setting of the client computer to a storage medium. The client computer is configured to receive an operating system image. The operating system image is configured to load an operating system on the client computer. The configuration setting associates the peripheral with the client computer within the operating system. Other embodiments of the computer program product are also described.

Embodiments of a system are also described. In one embodiment, the system is a system for transmitting an operating system to a client computer. In one embodiment, the system includes an operating system image server to transmit an operating system image to a client computer, an operating system image storage, and a peripherals database. The operating system image is for transmission to the client computer to load an operating system. The operating system image includes a computer identifier to identify the client computer, a peripheral information retriever, and a configuration setting writer. The peripheral information retriever retrieves peripheral information to identify a peripheral to be associated with the client computer. The configuration setting writer writes a configuration setting of the client computer to a storage medium based on the peripheral information. The configuration setting associates the peripheral with the client computer within the operating system. Other embodiments of the system are also described.

Embodiments of a method are also described. In one embodiment, the method is a method for configuring an operating system to associate a peripheral. The method includes loading the operating system on a client computer based on an operating system image, determining an identifier of the client computer, retrieving peripheral information to identify a peripheral associated with the client computer, and writing a configuration setting of the client computer to a storage medium of the client computer based on the peripheral information. The identifier identifies the client computer. The peripheral information is associated with the client computer based on an association between the peripheral information and the identifier. Other embodiments of the method are also described.

Embodiments of another method are also described. In one embodiment, the method is a method for configuring an operating system to associate a peripheral in a call center. The method includes transmitting an operating system image to a client computer in a call center, determining an identifier of the client computer, retrieving peripheral information to identify a telephone extension to be associated with the client computer, writing a configuration setting of the client computer to a storage medium of the client computer based on the peripheral information, and monitoring a conversation on the telephone extension and a concurrent activity on the client computer. The operating system image is configured to load an operating system on the client computer. The identifier identifies the client computer. The telephone extension is associated with the client computer based on an association between the peripheral information and the identifier and the telephone extension and the client computer used by a user in the call center. The configuration setting associates the telephone extension with the client computer within the operating system. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

In certain embodiments, a configuration application configures an operating system for a client computer to associate one or more peripherals with the client computer. This configuration may be based on an identifier for the client computer and/or a user identifier. By dynamically configuring the operating system based on the identifier and/or the user identifier, applications that require information about peripherals can function properly regardless of what computer the user is using and what user is using the computer.

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

While many embodiments are described herein, at least some of the described embodiments determine an identifier for a client computer, retrieve peripheral information for a peripheral associated with the a client computer, and write a configuration setting using the peripheral information.

Figure 1:
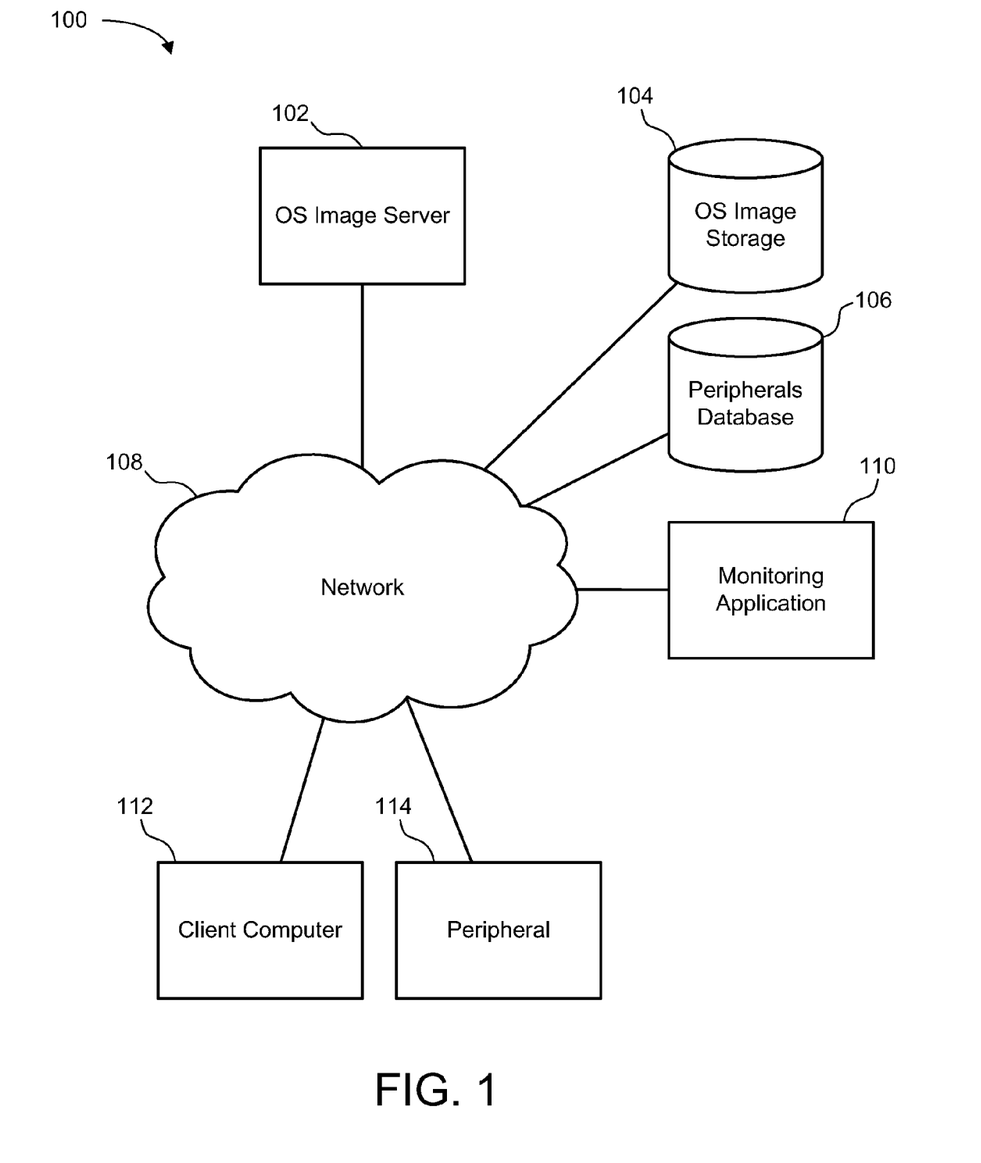
FIG. 1 depicts a schematic diagram of one embodiment of a system for configuring an operating system image to associate a peripheral with a client computer.

FIG. 1 depicts a schematic diagram of one embodiment of a system 100 for configuring an operating system image to associate a peripheral 114 with a client computer 112. The system 100 includes an operating system (OS) image server 102, an OS image storage 104, a peripherals database 106, a network 108, a monitoring application 110, a client computer 112, and a peripheral 114. The system 100 determines that the peripheral 114 is associated with the client computer 112 and records configuration information for the client computer 112 based on this association.

The OS image server 102, in one embodiment, transmits an OS image to the client computer 112. The OS image server 102 retrieves the OS image from the OS image storage 104. In some embodiments, the OS image server 102 retrieves the OS image over the network 108. In an alternate embodiment, the OS image server 102 is connected directly to the OS image storage 104, and retrieves the OS image over this connection. In yet another embodiment, the OS image storage 104 is a component of the OS image server 102.

In one embodiment, the OS image server 102 transmits a generic OS image in response to a request for an OS image for a client computer 112. This generic OS image is configured to operate on a plurality of client computers 112 and for a plurality of users. The generic OS image includes a configuration application to execute on the client computer 112 to determine one or more peripherals 114 associated with the client computer 112. The configuration application further operates to write configuration information based on this association to a configuration file of the client computer 112.

In an alternate embodiment, the OS image server 102 includes a configuration application that operates on the OS image server 102 and modifies the OS image before transmission to the client computer 112. In this embodiment, the configuration application determines an identifier for the client computer 112 in response to a request for transmission of an OS image to the client computer 112. The configuration application further operates to determine one or more peripherals 114 associated with the client computer 112 and writes configuration information reflecting this association to the OS image. The OS image server 102 transmits the modified OS image to the client computer 112.

The OS image storage 104, in some embodiments, stores one or more OS images. An OS image stored on the OS image storage 104 is designed for transmission to a client computer 112 for loading of an OS on the client computer 112. The OS image storage 104, in one embodiment, includes one or more magnetic storage devices, such as hard drives, computer tapes, or the like. In an alternate embodiment, the OS image storage 104 includes one or more electronic storage devices, such as flash memory. In yet another embodiment, the OS image storage 104 includes one or more optical storage devices, such as a digital versatile disk (DVD).

The peripherals database 106, in one embodiment, is a database that includes one or more records. A record in the peripherals database 106 associates a peripheral 114 with a client computer 112. For example, a record in the peripherals database 106 may include an identifier that identifies a client computer 112 and peripheral information that identifies a peripheral 114. The inclusion of the identifier and the peripheral information in the same record indicates that the peripheral 114 is associated with the client computer 112.

The peripherals database 106, in one embodiment, is a remote database accessed over the network 108. For example, the client computer 112 may execute the configuration application and access the peripherals database 106 remotely over the network 108 to determine peripheral information for the client computer 112. In an alternate embodiment, the peripherals database 106 is located at the same computer as the configuration application and is directly accessed by the configuration application to determine a peripheral 114. For example, the peripherals database 106 may be a table included with the OS image and streamed to the client computer 112. In this example, the configuration application operating on the client computer 112 accesses the peripherals database 106 located on the client computer 112.

In one embodiment, the network 108 transmits data between one or more components of the system 100. The network 108 may be a local network, a wide area network, or a combination of local and nonlocal networks. For example, some components of the system 100 may connect over a high-speed local area network (LAN), while other components of the system 100 may connect over the Internet.

The monitoring application 110 monitors activity occurring on the client computer 112 and the peripheral 114 in one embodiment. In certain embodiments, the monitoring application 110 accesses configuration information stored on the client computer 112 to determine a peripheral 114 to monitor. For example, the peripheral 114 may be a telephone extension associated with the client computer 112 in a call center, and the monitoring application 110 may record a conversation on the telephone extension along with concurrent activity by a user on the client computer 112. In this example, the monitoring application may determine the telephone extension associated with the client computer 112 by accessing the configuration information stored by the configuration application. By monitoring the conversation on the telephone extension and concurrent activity by a user on the client computer 112, a supervisor can evaluate the performance of the user.

In another embodiment, the monitoring application 110 may access the peripherals database 106 to determine the peripheral 114. For example, the monitoring application 110 may be used to record a call session on a peripheral 114 that is a telephone extension along with actions by a user on the client computer 112. In this example, the monitoring application 110 may access the peripherals database 106 to determine the telephone extension to record based on an identifier of the client computer 112.

The client computer 112, in one embodiment, is a computer configured to receive a streamed OS image from the OS image server 102. The client computer 112 is further configured to load an operating system using the OS image in some embodiments. In one embodiment, the client computer 112 includes a storage medium to store configuration information.

In one embodiment, the client computer 112 is a desktop computer. In another embodiment, the client computer 112 is a thin client computer. In a different embodiment, the client computer 112 is a portable computing device, such as a laptop computer, a personal data assistant (PDA), or a mobile phone.

The peripheral 114, in one embodiment, is a peripheral associated with the client computer 112. The peripheral 114 may be associated by proximity to the client computer 112. For example, the peripheral 114 may be a telephone that shares a workspace, such as an office, with the client computer 112. In another example, the peripheral 114 may be a printer that shares a floor with the client computer 112.

In some embodiments, the peripheral 114 is associated with the client computer based on the user of the client computer. For example, the peripheral 114 may be a telephone extension assigned to the user.

In one embodiment, the peripheral 114 is coupled to the network 108. In another embodiment, the peripheral 114 is coupled to the client computer 112. For example, the peripheral 114 may be a printer coupled to the client computer 112 by a universal serial bus (USB) connection.

Figure 2:
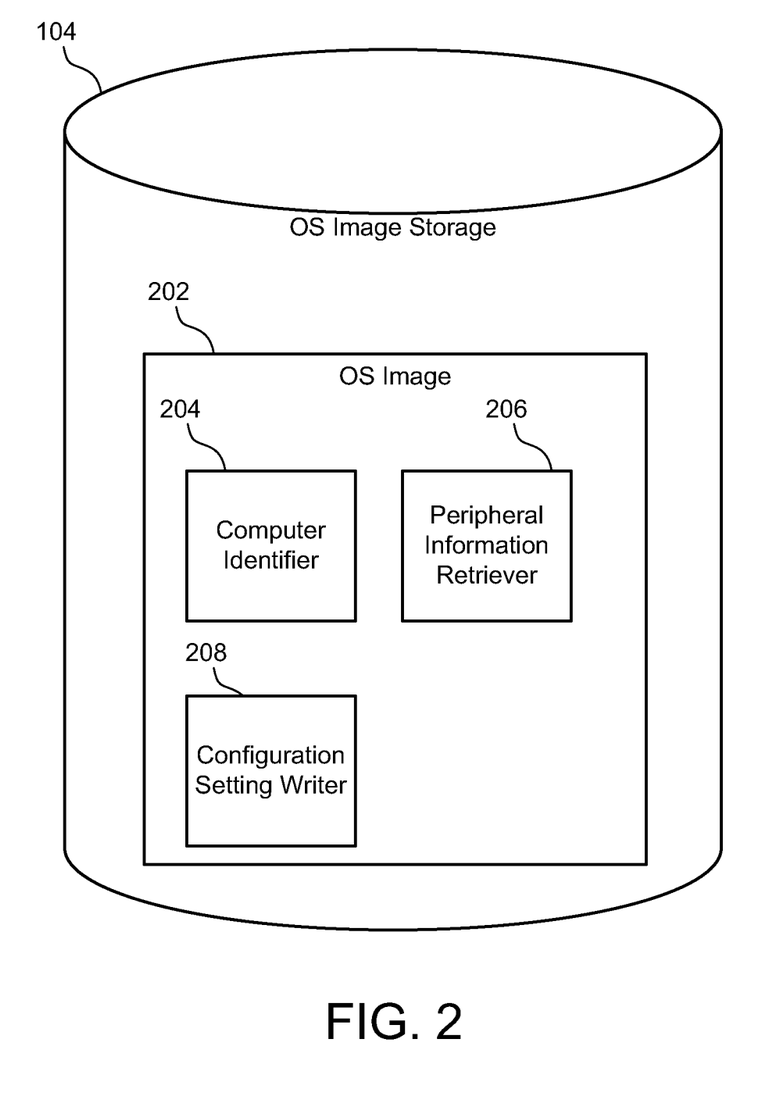
FIG. 2 depicts a schematic diagram of one embodiment of the operating system image storage of FIG. 1.

FIG. 2 depicts a schematic diagram of one embodiment of the OS image storage 104 of FIG. 1. The OS image storage 104, in one embodiment, includes an OS image 202, which in turn includes a computer identifier 204, a peripheral information retriever 206, and a configuration setting writer 208. The OS image storage 104 stores one or more OS images 202 for transmission to a client computer 112.

The OS image 202, in one embodiment, is a file or collection of files configured to load an operating system on the client computer 112. The OS image 202 is stored on the OS image storage 104. In some embodiments, the OS image 202 includes a boot loader to initiate loading of the operating system on the client computer. In an alternate embodiment, a boot loader separate from the OS image 202 initiates loading of the operating system.

In one embodiment, the OS image 202 includes a computer identifier 204. The computer identifier 204 includes computer code that causes the client computer 112 to determine an identifier for the client computer 112. For example, the computer identifier 204 may access a network controller of the client computer 112 and determine a media access control (MAC) address of the network card. The MAC address may be used as the identifier of the client computer 112.

The peripheral information retriever 206, in certain embodiments, uses the identifier determined by the computer identifier 204 to retrieve peripheral information for a peripheral 114. The peripheral information retriever 206 accesses the peripherals database 106 to determine the peripheral information. For example, the peripherals database 106 may be included in the OS image 202 as a table and the peripheral information retriever 206 may access the table using the identifier to retrieve the peripheral information.

In an alternate embodiment, the peripheral information retriever 206 may access a remote database, such as the peripherals database 106 as depicted in FIG. 1. For example, the peripheral information retriever 206 may send a request over the network 108 to the peripherals database 106 using the identification to determine the peripheral information.

In one embodiment, the configuration setting writer 208 writes a configuration setting of the client computer 112 using the peripheral information retrieved by the peripheral information retriever 206. The configuration setting writer 208 writes the configuration setting to a storage medium. For example, in one embodiment, the configuration setting writer 208 writes the configuration setting to a hard drive of the client computer 112.

In an alternate embodiment, the computer identifier 204, the peripheral information retriever 206, and the configuration setting writer 208 are not included with the operating system image 202. In one embodiment, the computer identifier 204, the peripheral information retriever 206, and the configuration setting writer 208 operate on the OS image server 102. In another embodiment, the computer identifier 204, the peripheral information retriever 206, and the configuration setting writer 208 are added to the OS image 202 after the OS image 202 is retrieved from the OS image storage 104 by the OS image server 102. In yet another embodiment, the computer identifier 204, the peripheral information retriever 206, and the configuration setting writer 208 are packaged in a configuration application transmitted separately from the OS image 202. In another embodiment, one or two of the computer identifier 204, the peripheral information retriever 206, and the configuration setting writer 208 are included with the OS image 202, and the remaining one or two of the computer identifier 204, the peripheral information retriever 206, and the configuration setting writer 208 are stored separately.

The peripherals database 106, in one embodiment, includes one or more records associating one or more peripherals 114 with a client computer 112. In some embodiments, the records of the peripherals database 106 include information that further associate a user identifier with a peripheral 114. For example, the peripherals database 106 may include a record that associates a particular telephone extension with a particular user using a particular client computer 112.

In one embodiment, the peripherals database 106 is included with the OS image 202. In an alternate embodiment, the peripherals database 106 is stored separately from the OS image 202. In a further embodiment, the peripherals database 106 is stored remotely from the client computer 112.

Figure 3:
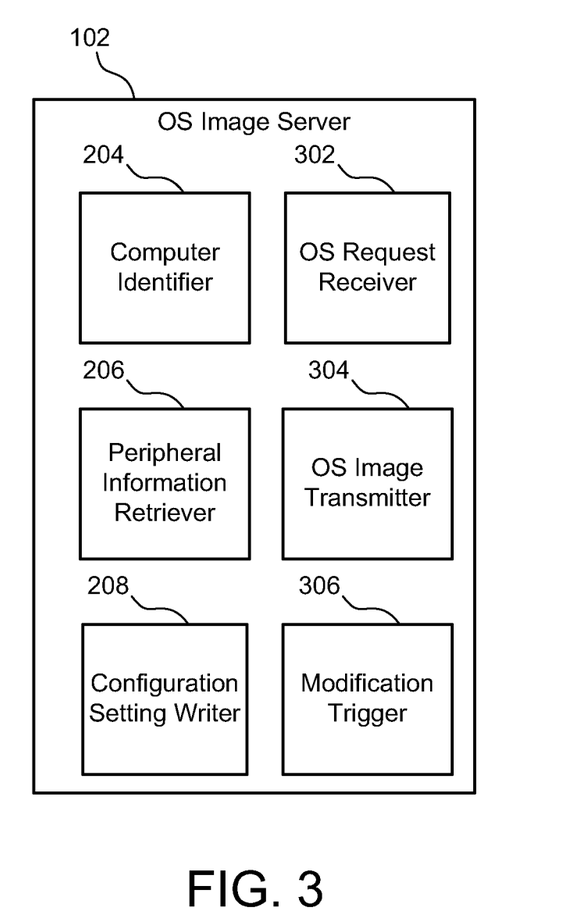
FIG. 3 depicts a schematic diagram of one embodiment of the operating system image server of FIG. 1.

FIG. 3 depicts a schematic diagram of one embodiment of the OS image server 102 of FIG. 1. The OS image server 102 includes a computer identifier 204, a peripheral information retriever 206, a configuration setting writer 208, an OS request receiver 302, an OS image transmitter 304, and a modification trigger 306. The OS image server 102 transmits an OS image to the client computer 112 for loading of an operating system on the client computer 112.

The computer identifier 204, in one embodiment, identifies a client computer 112 to which an OS image 202 is to be transmitted. In certain embodiments, a request for transmission for an OS image 202 includes an identifier that identifies the client computer 112. For example, the client computer may initiate the request for transmission of the OS image 202. The client computer 112 may determine the identifier and transmit the identifier along with the request to the OS image server 102. The computer identifier 204 may parse the transmission from the client computer 112 to extract the identifier and pass this identifier to one or more components of the OS image server 102.

In the illustrated embodiment, the computer identifier 204 is computer code that operates on the OS image server 102. In an alternate embodiment, the computer identifier 204 operates on a computer remote from the OS image server 102. In some embodiments, the computer identifier 204 operates on the client computer 112.

The peripheral information retriever 206, in one embodiment, retrieves peripheral information associated with the identifier from the peripherals database 106. The peripheral information retriever 206 accesses the peripherals database 106 to determine the peripheral information. In one embodiment, the peripheral information retriever 206 accesses a peripherals database 106 located on the OS image server 102. In an alternate embodiment, the peripheral information retriever 206 accesses a peripherals database 106 located remotely from the OS image server 102.

The peripheral information retriever 206, in the illustrated embodiment, operates on the OS image server 102. In an alternate embodiment, the peripheral information retriever 206 operates on a computer remote from the OS image server 102. In some embodiments, the peripheral information retriever 206 operates on the client computer 112.

In one embodiment, the configuration setting writer 208 writes a configuration setting using the peripheral information. The configuration setting indicates a peripheral 114 associated with the client computer 112. The configuration setting, in one embodiment, is written to a configuration file of the OS image 202. In another embodiment, the configuration setting is written to a storage medium of the client computer 112.

The configuration setting writer 208, in the illustrated embodiment, operates on the OS image server 102. In an alternate embodiment, the configuration setting writer 208 operates on a computer remote from the OS image server 102. In some embodiments, the configuration setting writer 208 operates on the client computer 112.

The OS request receiver 302, in one embodiment, receives a request to transmit an OS image 202 to the client computer 112. In one embodiment, the request is transmitted from the client computer 112. For example, the client computer may request an OS image by transmitting a request over the network 108 to the OS request receiver 302. In some embodiments, the OS request receiver 302 receives an identifier that identifies the client computer 112. The OS request receiver 302 passes the identifier to the computer identifier 204.

The OS image transmitter 304, in one embodiment, transmits an OS image 202 to the client computer 112. In some embodiments, the OS image transmitter 304 retrieves the OS image 202 from the OS image storage 104.

In one embodiment, the modification trigger 306 initiates operations to modify the OS image 202. The modification trigger 306, in one embodiment, initiates operations to modify the OS image 202 to include a configuration setting in a configuration file of the OS image 202.

In an alternate embodiment, the modification trigger 306 initiates operations to modify the OS image 202 to include a configuration application. For example, the OS image 202 may be a new OS image that does not include a configuration application, and the modification trigger 306 may initiate modification of the OS image file 202 to include a computer identifier 204, a peripheral information retriever 206, and a configuration setting writer 208 as illustrated in FIG. 2.

In some embodiments, the modification trigger 306 initiates operations to modify the OS image 202 in response to a triggering event. The triggering event, in one embodiment, is a request for transmission of the OS image 202 to the client computer 112. For example, the modification trigger 306 may initiate operations to write a configuration setting to a configuration file of the OS image 202 in response to a request for transmission of the OS image 202.

In another embodiment, the triggering event may be storage of the OS image 202 on the OS image storage 104. For example, in response to storage of a new OS image 202 without a configuration application, the modification trigger 306 may initiate operations to modify the OS image 202 to include a configuration application.

In a further embodiment, the triggering event may be an input from an administrator requesting modification of the OS image 202. For example, the administrator may determine that a new configuration application should be included with the OS image 202. In response to an input from the administrator, the modification trigger 306 may initiate operations to modify the OS image 202 to include the new configuration application.

The OS image storage 104, in one embodiment, stores one or more OS images 202. The OS image storage 104 is accessed by the OS image server 102 to retrieve an OS image 202. In one embodiment, the OS image storage 104 is a component of the OS image server 102. In an alternate embodiment, the OS image storage 104 is separate from the OS image server 102.

In one embodiment, the peripherals database 106 includes one or more records associating one or more peripherals 114 with a client computer 112. In some embodiments, the records of the peripherals database 106 include information that further associate a user identifier with a peripheral 114. In one embodiment, the peripherals database 106 is a component of the OS image server 102. In an alternate embodiment, the peripherals database 106 is separate from the OS image server 102.

Figure 4:
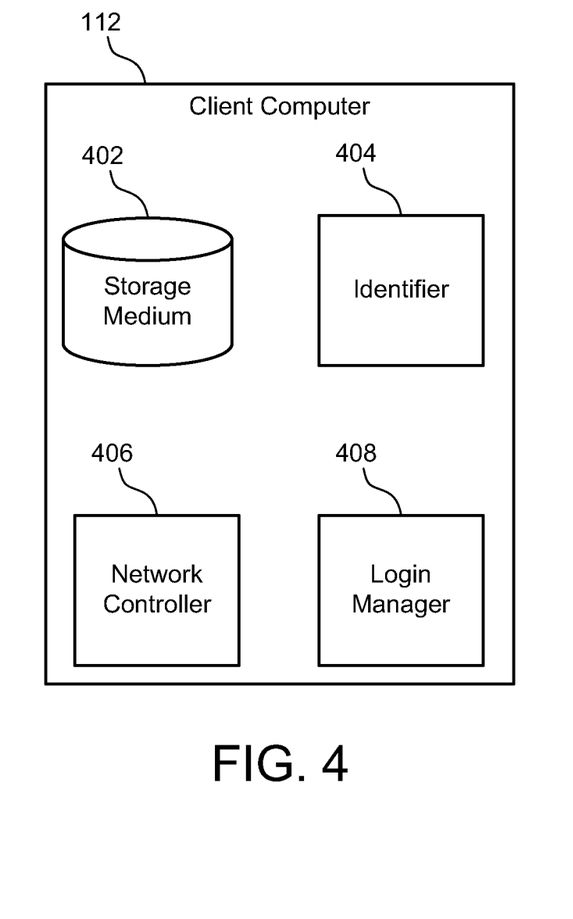
FIG. 4 depicts a schematic diagram of one embodiment of the client computer of FIG. 1.

FIG. 4 depicts a schematic diagram of one embodiment of the client computer 112 of FIG. 1. The client computer 112 includes a storage medium 402, an identifier 404, a network controller 406, and a login manager 408. The client computer 112 receives the OS image 202 for execution of an operating system.

In one embodiment, the storage medium 402 stores a configuration setting indicating peripheral information that identifies a peripheral 114 associated with the client computer 114. For example, the peripheral 114 may be a telephone extension located at the same work location as the client computer 112 and having peripheral information of 5-0101. In this example, the storage medium 402 may store a configuration file such as a registry that indicates that extension 5-0101 is associated with the client computer 112.

The storage medium 402, in one embodiment, is a magnetic storage medium, such as a hard disk or a tape drive. In an alternate embodiment, the storage medium 402 may be an electronic storage medium, such as flash memory. In yet another embodiment, the storage medium 402 may be an optical storage medium, such as a recordable DVD.

The identifier 404 is a code that identifies the client computer 112 in one embodiment. The identifier 404 may be any code that differentiates the client computer 112 from other computers receiving an OS image 202 from the OS image server 102. In one embodiment, the identifier 404 is a media access control (MAC) address of the network controller 406 of the client computer 112. In alternate embodiments, the identifier 404 may be a serial number of the client computer 112, a serial number of a processor of the client computer 112, an asset tag code of the client computer 112, or a code assigned to the client computer 112 by an administrator.

In one embodiment, the network controller 406 transmits and receives information over the network 108. The network controller 406 receives the OS image 202 over the network 108. In some embodiments, the network controller 406 transmits a request for transmission of the OS image 202 over the network 108 to the OS image server 102. The network controller 406, in one embodiment, includes a MAC address which identifies the network controller 406, and may be used as a proxy for identifying the client computer 112.

The login manager 408, in one embodiment, manages access to the client computer 112 for a user. In one embodiment, the login manager 408 receives a user identifier from the user which identifies the user. For example, the login manager 408 may receive a user identifier of "User 1" from a user.

In one embodiment, the login manager 408 initiates a request for an OS image 202 in response to a login by the user. For example, the user may access the login manager 408 to request access to the client computer 112. In response to access by the user, the login manager 408 may request an operating system image 202 for the client computer 112.

In some embodiments, the login manager 408 passes the user identifier to the peripheral information retriever 206 for use in determining a peripheral 114. For example, the user identifier may indicate a particular user, and a record in the peripherals database 106 may indicate that a peripheral 114 is associated with the user identifier. In this example, the login manager 408 receives the user identifier from the user and passes the user identifier to the peripheral information retriever 206. The peripheral information retriever 206 accesses the peripherals database 106 using the user identifier to determine the peripheral information.

Figure 5:
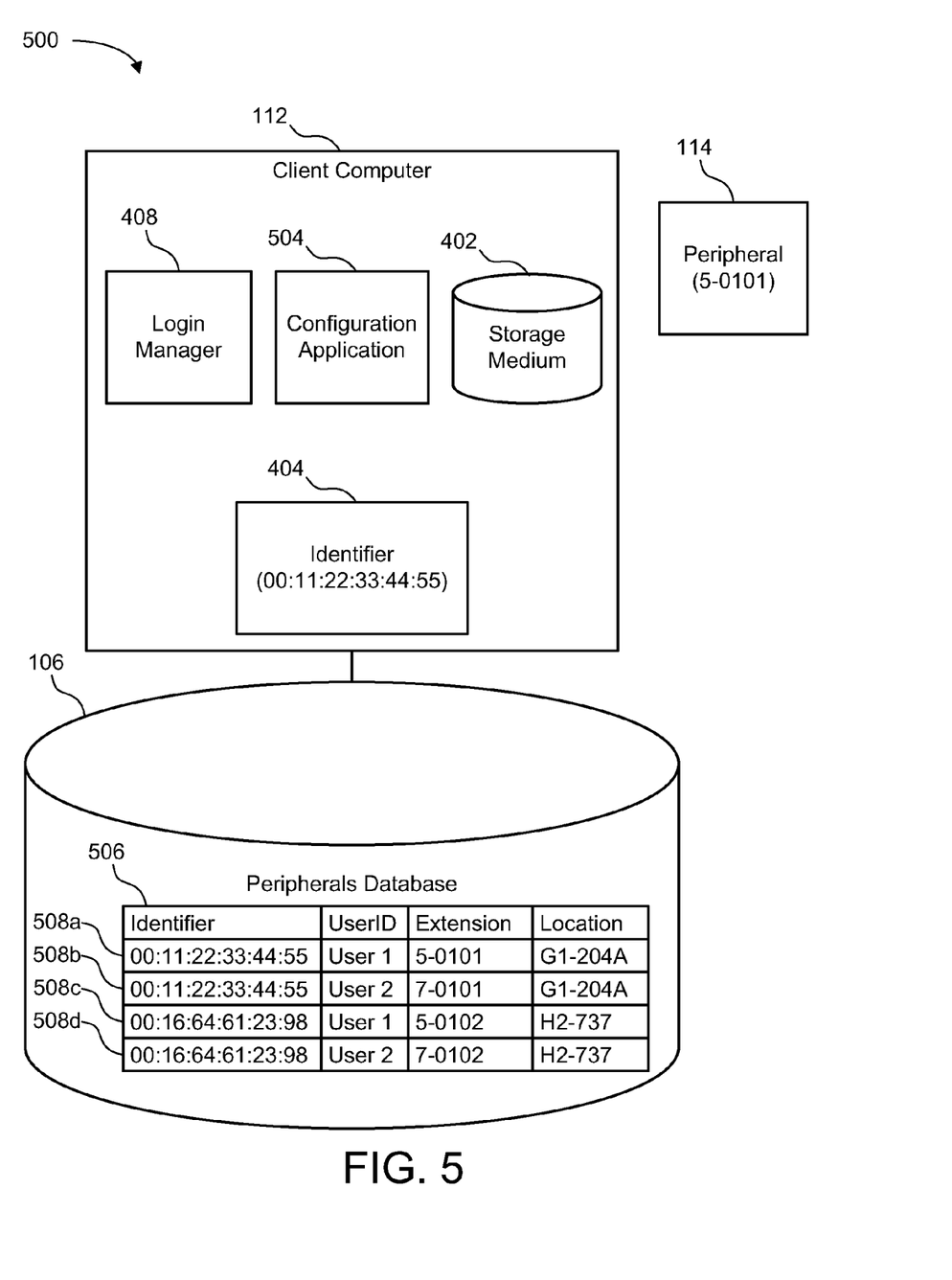
FIG. 5 depicts a schematic diagram of one embodiment of a system for configuring the client computer of FIG. 1 to associate a peripheral using a configuration application.

FIG. 5 depicts a schematic diagram of one embodiment of a system 500 for configuring a client computer 112 to associate a peripheral 114 using a configuration application 504. The system 500 includes a client computer 112, a peripheral 114, and a peripherals database 106. The system 500 configures the client computer 112 to write a configuration setting to a storage medium 402. The configuration setting indicates that the peripheral 114 is associated with the client computer 112.

In one embodiment, the client computer 112 includes a login manager 408, a configuration application 504, a storage medium 402, and an identifier 404. The client computer 112, in one embodiment, executes the configuration application 504 in response to an input by a user to the login manager 408. In an alternate embodiment, the configuration application 504 is executed automatically in response to a boot sequence of the client computer 112.

The login manager 408, in one embodiment, receives an input from the user. In response to the input from the user, the login manager 408 directs the configuration application 504 to write a configuration setting to the storage medium 402.

In one embodiment, the login manager 408 receives an input from the user to direct the client computer 112 to retrieve an OS image 202 from the OS image server 102. For example, the user may access the login manager 408 and direct the login manager 408 to load a new operating system image 202. In some embodiments, the direction to load a new operating system image 202 is an action to initiate a boot sequence of the client computer 112.

In some embodiments, the login manager 408 receives an input from the user that indicates a user identifier of the user that identifies the user. In one embodiment, the login manager 408 provides a login prompt that requires the user to input a user identifier. For example, the user may access the login manager 408 by inputting a user identifier of "User 1" into a login prompt.

The configuration application 504, in one embodiment, is computer code that executes on the client computer 112 to write a configuration setting to the storage medium 402. In some embodiments, the configuration application 504 includes a computer identifier 204, a peripheral information retriever 206, and a configuration setting writer 208. In certain embodiments, the configuration application 504 is included with the OS image 202 and loaded with the operating system on the client computer 112.

In some embodiments, the configuration application 504 receives an input from the user via the login manager 408. For example, the login manager 408 may receive a user identifier from the user and pass the user identifier to the configuration application 504. The configuration application 504 may then use the user identifier to determine peripheral information for a peripheral 114.

The storage medium 402, in one embodiment, stores a configuration setting indicating peripheral information for a peripheral 114. The configuration application 504 accesses the storage medium 402 and writes the configuration setting to the storage medium 402. For example, the configuration application 504 may determine that a telephone with an extension of 5-0101 is associated with the client computer 112 and may write the extension number to a registry of the client computer 112 stored on the storage medium 402.

The identifier 404, in some embodiments, identifies the client computer 112. In some embodiments, the identifier 404 is accessed by the configuration application 504 for use to determine peripheral information for a peripheral 114. For example, the configuration application 504 may access the identifier 404 and determine that the MAC address of the computer is 00:11:22:33:44:55. The configuration application 504, in this example, then accesses the peripherals database 106 to determine that the computer is located at location G1-204A.

In one embodiment, the peripherals database 106 includes a table 506 that includes one or more records 508a, 508b, 508c, 508d (collectively referred to as records 508) that associate peripheral information with the identifier 404 and/or a user identifier. The peripherals database 106 is accessed by the configuration application 504 to determine the peripheral information. In one embodiment, the peripherals database 106 is a remote database accessed over a network 108. In another embodiment, the peripherals database 106 is located on the client computer 112.

The system 500, in one embodiment, operates to determine one or more peripherals 114 for a client computer 112. For example, the user may access the login manager 408 to initiate a boot sequence of the client computer 112. The login manager 408 requests an OS image 202 from the OS image server 102. The OS image 202 includes a configuration application 504 and loads an operating system along with the configuration application 504 on the client computer 112. The login manager 408 receives a user identifier from the user of "User 1" and passes the user identifier to the configuration application 504. The configuration application 504 retrieves the identifier 404 of 00:11:22:33:44:55 and accesses the peripherals database 106 using the user identifier and the identifier 404. The peripherals database 106 indicates in record 508a that a client computer 112 with an identifier 404 of 00:11:22:33:44:55 and being operated by a user with a user identifier of "User 1" has peripheral data indicating that a telephone used by the user has an extension number of 5-0101. The configuration application 504 writes the extension number to the registry of the client computer 112 on the storage medium 402.

Figure 6:
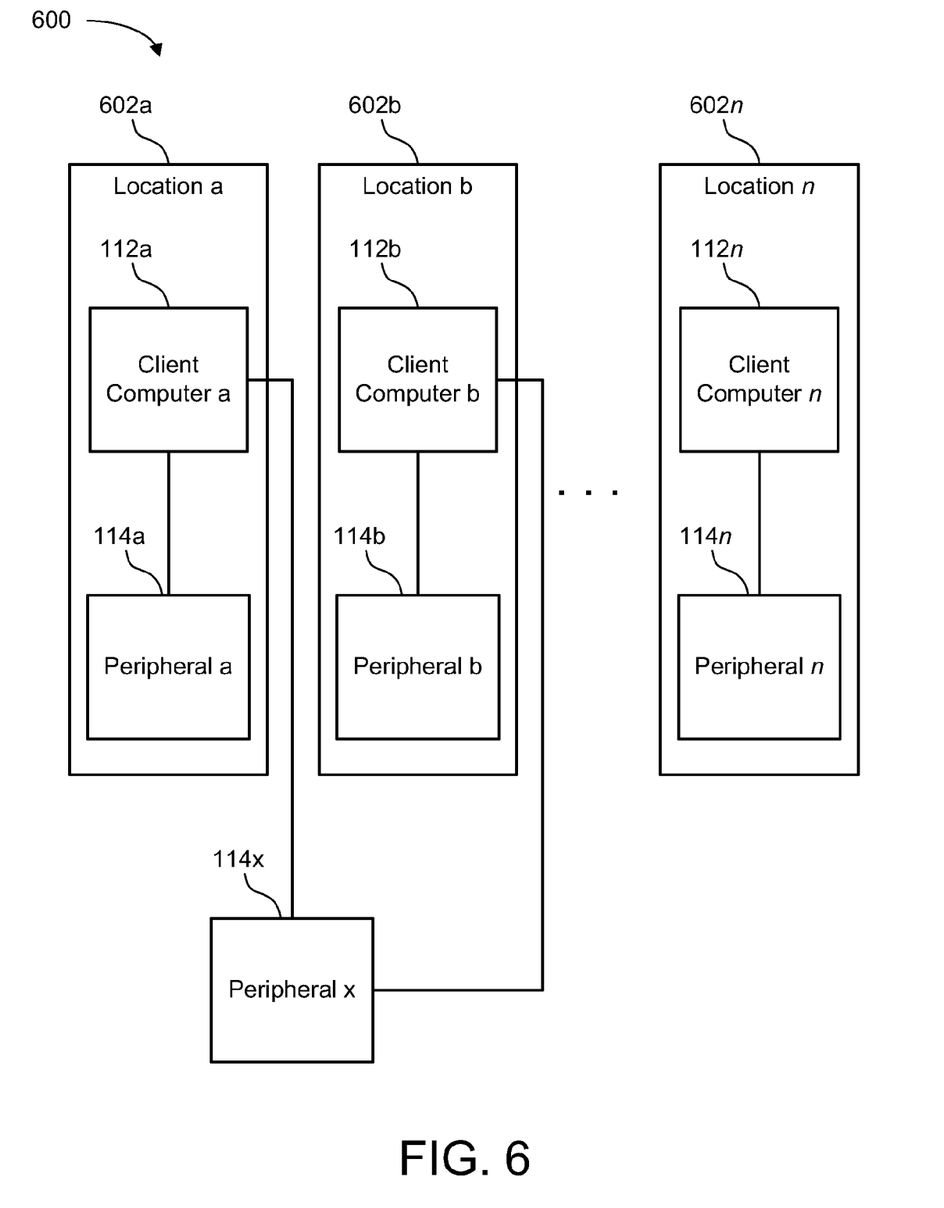
FIG. 6 depicts a schematic diagram of one embodiment of a system of client computers associated with one or more peripherals using the system of FIG. 1.

FIG. 6 depicts a schematic diagram of one embodiment of a system 600 of client computers 112a, 112b, 112n (collectively referred to as client computers 112) associated with one or more peripherals 114a, 114b, 114n, 114x (collectively referred to as peripherals 114) using the system 100 of FIG. 1. In one embodiment, each client computer 112 is located at a respective location 602a, 602b, 602n (collectively referred to as locations 602). The locations 602 may each be a workspace shared by the client computer 112 and the peripheral 114, such as an office or cubicle.

The client computer 112, in one embodiment, is associated with a single peripheral 114. For example, client computer n 112n may be associated with peripheral n 114n and no other peripherals. In an alternate embodiment, the client computer 112 may be associated with more than one peripheral 114. For example, client computer a 112a may be associated with peripheral a 114a and peripheral x 114x.

Similarly, in some embodiments, the peripheral 114 is associated with a single client computer 112. For example, peripheral a 114a may be a telephone extension associated only with client computer a 112a. In another embodiment, the peripheral 114 is associated with more than one client computer 112. For example, peripheral x 114x may be a printer associated with client computer a 112a and client computer b 112b.

In some embodiments, the client computer 112 and the peripheral 114 share a location 602. For example, location a 602a may be a desk shared by client computer a 112a and a telephone indicated by peripheral a 114a. In this example, the configuration application 504 determines that the telephone and the client computer 112a are associated and the configuration application 504 writes a configuration setting indicating this association.

In another embodiment, the peripheral 114 is located in a different location than the client computer 112. For example, a particular printer may be associated with a client computer 112 even though the printer is not located in the same location 602 as the client computer 112. In this example, the printer may be peripheral x 114x, and the computer with which the peripheral is associated may be client computer a 112a. The configuration application 504 for client computer a 112a uses information from client computer a 112a to access the peripherals database 106 and determines that the printer is associated with client computer a 112a. In response to this determination, the configuration application 504 writes a configuration setting indicating this association to the storage medium 402.

Figure 7:
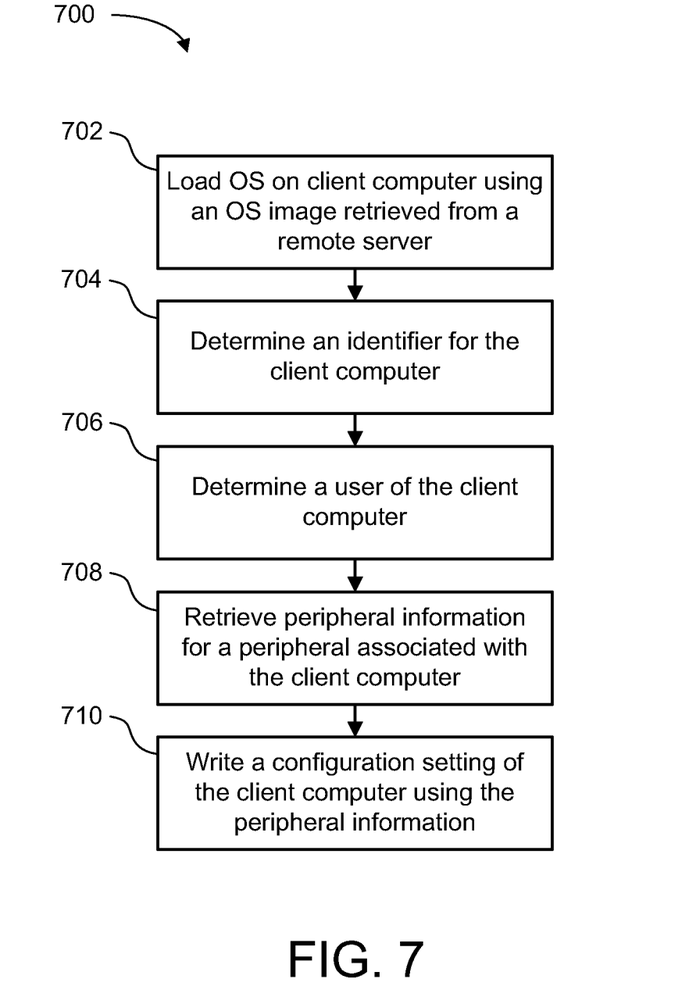
FIG. 7 is a flowchart diagram depicting one embodiment of a method for configuring an operating system to associate a peripheral with a client computer.

FIG. 7 is a flowchart diagram depicting one embodiment of a method 700 for configuring an operating system image 202 to associate a peripheral 114 with a client computer 112. The method 700 is, in certain embodiments, a method of use of the systems and apparatuses of FIGS. 1-6, and is described with reference to those figures. Nevertheless, the method 700 may also be conducted independently thereof and is not intended to be limited to the specific embodiments discussed above with respect to those figures.

In method 700, an operating system image 202 is configured to associate a peripheral 114 with a client computer 112. As shown in FIG. 7, the client computer 112 loads 702 an operating system using an OS image 202 retrieved from a remote server such as an OS image server 102. In some embodiments, the OS image 202 is retrieved in response to an input from a user. In another embodiment, the OS image 202 is retrieved in response to a boot sequence of the client computer 112.

The operating system is loaded 702, in one embodiment, automatically in response to receiving the OS image 202. In another embodiment, the operating system is loaded in response to input from the user.

In certain embodiments, loading 702 the operating system includes loading a configuration application 504 on the client computer 112. The configuration application 504 is computer code that executes on the client computer 112 to perform other steps of the method 700.

The configuration application 504, in some embodiments, includes a computer identifier 204 that determines 704 an identifier 404 of the client computer 112. The identifier 404 differentiates the client computer 112 from other computers using the system 100. In some embodiments, the identifier 404 is a MAC address of a network controller 406 of the client computer 112.

In one embodiment, the configuration application 504 determines 706 a user of the client computer 112. For example, the login manager 408 may receive an input from a user indicating that the user has a user identifier of "User 1." The configuration application 504, in this example, retrieves this user identifier from the login manager 408.

The configuration application 504, in one embodiment, includes a peripheral information retriever 206 that retrieves 708 peripheral information for the peripheral 114. In one embodiment, the configuration application 504 accesses the peripherals database 106 to retrieve 708 the peripheral information. In some embodiments, the peripherals database 106 is a remote database and is accessed by the configuration application 504 over the network 108.

In certain embodiments, the configuration application 504 includes a configuration setting writer 208 that writes 710 a configuration setting of the client computer 112 to the storage medium 402. The configuration setting is derived from the peripheral information and indicates that the peripheral 114 is associated with the client computer 112.

By configuring the operating system to include a configuration setting that indicates an association between a client computer 112 and a peripheral 114, a flexible and dynamic network may be employed that allows for virtual workspaces with minimal input from users. Additionally, applications that require access to both client computers and associated peripherals can function without additional configuration.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to determine an identifier to identify a client computer, retrieve peripheral information to identify a peripheral to be associated with the client computer, and write a configuration setting of the client computer to a storage medium. The client computer is configured to receive an operating system image. The operating system image is configured to load an operating system on the client computer. The configuration setting associates the peripheral with the client computer within the operating system.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product comprising a non-transitory computer useable storage medium to store a computer readable program, wherein the computer readable program, when executed on a computer, causes the computer to perform operations comprising:
   subsequent to receipt of a generic operating system image at a client computer and in response to a first trigger event at the client computer, determining an identifier to identify the client computer;
   determining a location identifier to identify a physical location of the client computer;
   retrieving peripheral information comprising an extension number to identify a telephone associated with the client computer, wherein the telephone is external to the client computer, and wherein the telephone is associated with the client computer based on the physical location of the client computer and an identity of a user who is currently using the client computer;
   writing a configuration setting of the client computer to a storage medium based on the peripheral information, the configuration setting to associate the telephone with the client computer; and
   modifying the generic operating system image based on the association of the telephone and the client computer to generate an operating system for the client computer that is operative with the telephone.

2. The computer program product of claim 1, wherein the generic operating system image comprises a configuration application, the configuration application to execute on the client computer in response to a second trigger event, the configuration application to perform the operations for determining the identifier, retrieving the peripheral information, writing the configuration setting, and modifying the generic operating system image.

3. The computer program product of claim 2, wherein:
   the first trigger event is a boot sequence of the client computer, and
   the second trigger event is identification of a user of the client computer.

4. The computer program product of claim 1, wherein the identifier is a media access control (MAC) address of a network controller of the client computer.

5. The computer program product of claim 1, further comprising an operation to retrieve the location identifier.

6. The computer program product of claim 1, wherein the client computer comprises a thin client computer.

7. The computer program product of claim 1, wherein the client computer and the telephone are independently coupled to a network, and the telephone is associated with the client computer based on a shared workspace of the client computer and an external peripheral.

8. The computer program product of claim 1, wherein the first trigger event is a boot sequence of the client computer.

9. The computer program product of claim 1, wherein the computer readable program further causes the computer to perform operations comprising:
   loading the operating system to the client computer.

10. A computer-implemented method comprising:
    receiving, on a client computer, a generic operating system image retrieved from a remote server;
    determining an identifier of the client computer, the identifier identifying the client computer;
    determining a location identifier to identify a physical location of the client computer;
    retrieving peripheral information from a table that comprises a record of an association between the peripheral information and the identifier, wherein the peripheral information identifies a telephone associated with the client computer, wherein the telephone is external to the client computer, and wherein the telephone is associated with the client computer based on a physical location of the client computer and an identity of a user who is currently using the client computer;
    writing a configuration setting of the client computer to a storage medium of the client computer based on the peripheral information, the configuration setting to associate the telephone with the client computer;
    modifying the generic operating system image based on the association of the telephone and the client computer to generate an operating system for the client computer that is operative with the telephone.

11. The computer-implemented method of claim 10, wherein the table is stored in a remote database.

12. The computer-implemented method of claim 10, wherein the operating system image comprises the table.

13. The computer-implemented method of claim 10, further comprising:
determining a user identifier of a user of the client computer; and
retrieving the peripheral information for the telephone based on the user identifier, wherein the telephone is associated with the user.

14. The computer-implemented method of claim 13, wherein the configuration setting is further based on the user identifier.

15. The computer implemented method of claim 10, further comprising:
loading the operating system to the client computer.

16. A computer program product comprising a non-transitory computer useable storage medium to store a computer readable program, wherein the computer readable program, when executed on a computer, causes the computer to perform operations comprising:
subsequent to receipt of a generic operating system image at a server and in response to a trigger event at the server, determining an identifier to identify a client computer;
determining a location identifier to identify a physical location of the client computer;
retrieving peripheral information comprising an extension number to identify a telephone associated with the client computer, wherein the telephone is external to the client computer, and wherein the telephone is associated with the client computer based on the physical location of the client computer and an identity of a user who is currently using the client computer;
writing a configuration setting of the client computer to a storage medium based on the peripheral information, the configuration setting to associate the telephone with the client computer within an operating system; and
modifying the generic operating system image based the association of the telephone and the client computer to generate a modified operating system image for the client computer.

17. The computer program product of claim 16, wherein the generic operating system image comprises a configuration application, the configuration application to execute on the server in response to the triggering event, the configuration application to perform the operations for determining the identifier, retrieving the peripheral information, writing the configuration setting, and modifying the generic operating system image.

18. The computer program product of claim 16, wherein the computer readable program further causes the computer to perform operations comprising: transmitting the modified operating system image to the client computer.

19. The computer program product of claim 18, wherein the modified operating system image includes an operating system that is operative with the telephone.

20. The computer program product of claim 16, wherein the trigger event is a request to transmit an operating system image to the client computer.

* * * * *